United States Patent [19]
McConnell

[11] 4,271,659
[45] Jun. 9, 1981

[54] AIR DUCT SYSTEM FOR A COTTON HARVESTER

[75] Inventor: Kenneth C. McConnell, Ankeny, Iowa

[73] Assignee: Deere & Company, Moline, Ill.

[21] Appl. No.: 100,318

[22] Filed: Dec. 5, 1979

[51] Int. Cl.³ .................................................. A01D 45/18
[52] U.S. Cl. ........................................... 56/13.3; 56/30
[58] Field of Search ............... 56/13.3, 12.8, 12.9, 56/13.1, 13.2, 16.6, 30; 137/861

[56] References Cited

U.S. PATENT DOCUMENTS

| | | | |
|---|---|---|---|
| 3,376,897 | 4/1968 | Dolder et al. | 137/861 |
| 3,487,450 | 12/1969 | Hubbard | 56/13.3 |

*Primary Examiner*—Jay N. Eskovitz

[57] ABSTRACT

An air distribution system for a cotton harvester which permits use of a common air conduit to feed two cotton conveying ducts. An air distribution nozzle distributes an input flow of air from the air conduit between a jet nozzle associated with one of the conveying ducts and an outlet that is connected to a second jet nozzle associated with the other conveying duct.

16 Claims, 7 Drawing Figures

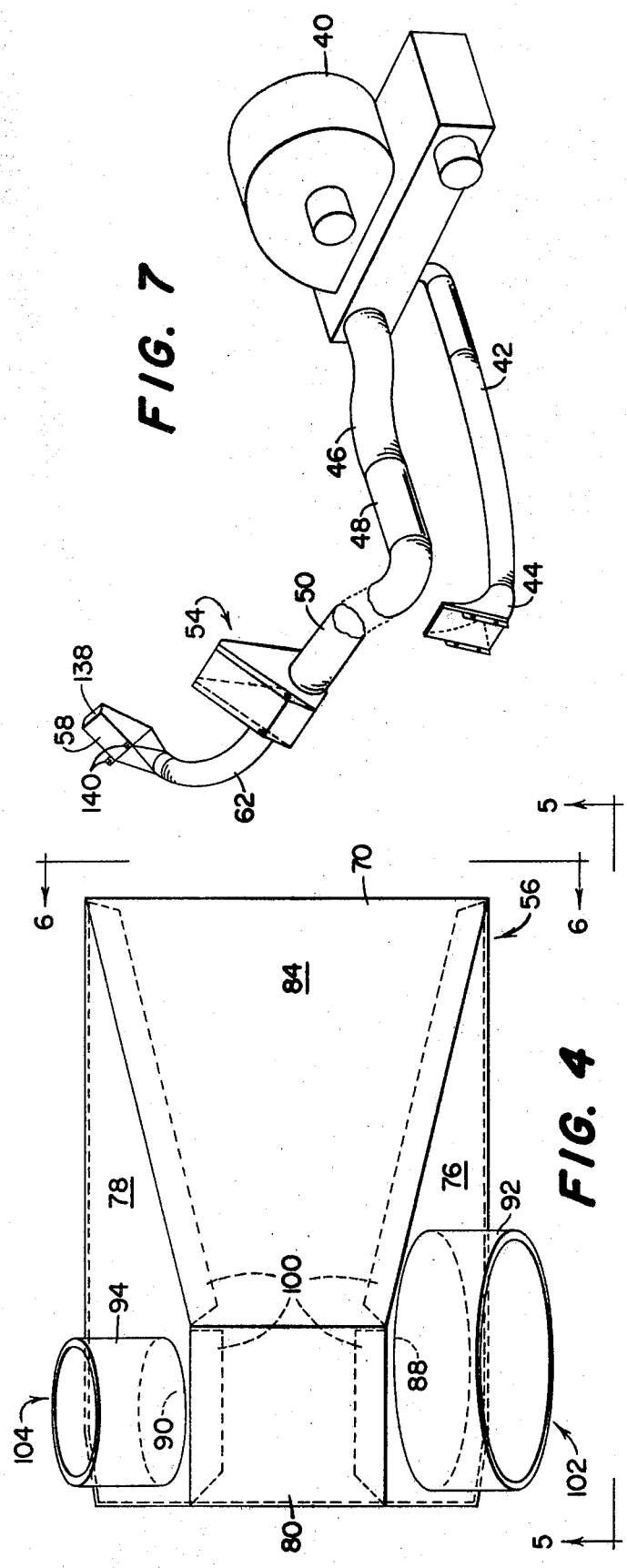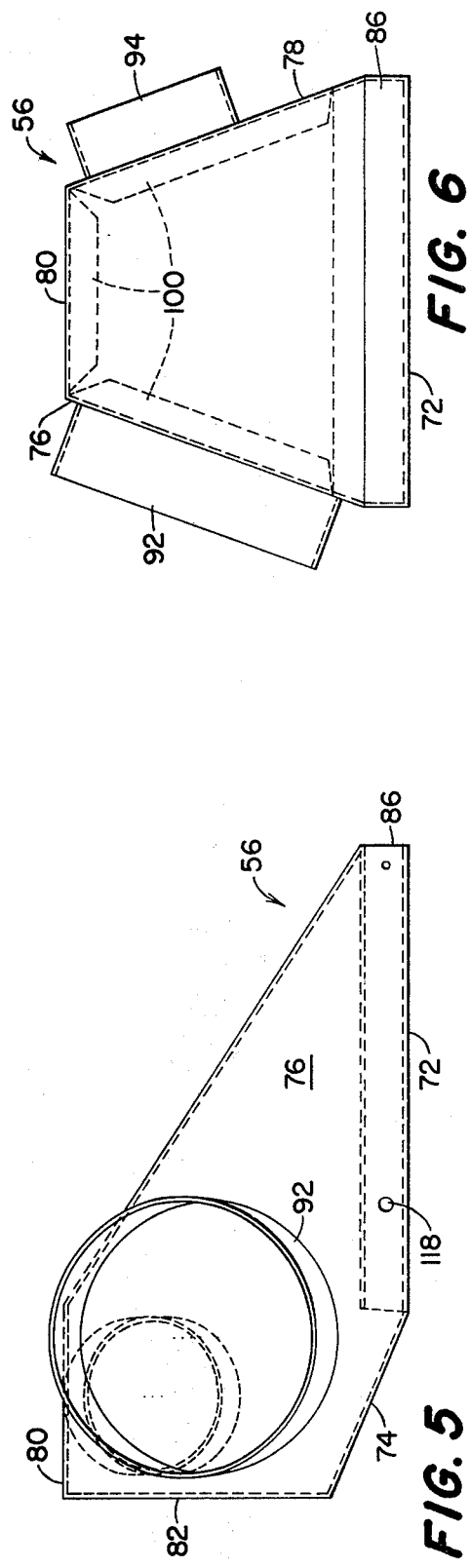

4,271,659

AIR DUCT SYSTEM FOR A COTTON HARVESTER

BACKGROUND OF THE INVENTION

The present invention relates generally to a cotton harvester and more specifically to an air system for the cotton conveying ducts of such a harvester.

To convey cotton from the rear of the harvesting units to the basket of a cotton harvester, ducts are commonly provided such as shown in U.S. Pat. No. 3,515,437. Air is directed into the lower portion of each duct by a spout or nozzle which induces a flow of air by vacuum below the nozzle to draw cotton upwardly toward the nozzle from a suction door structure on the cotton harvesting unit. The cotton is then propelled upwardly to the basket by the stream of air from the nozzle.

Connected to each nozzle is a flexible conduit that extends around the harvesting unit housing to a blower located on the harvester frame for providing air flow to move the cotton. Such a blower is shown, for example, in U.S. Pat. No. 3,464,191. The problem with this type of structure is that the blower is far removed from the ducts and a large amount of expensive flexible conduit is required since each duct is fed by a separate conduit. The conduit is easily damaged since it must be routed around the harvester units near the lift and drive assemblies. In addition, four-row cotton harvesters of the type, for example, described in U.S. Pat. No. 3,031,828, typically have as many as six cotton conveying ducts which greatly increases the amount of conduit required if a conventional air distribution system is utilized.

SUMMARY OF THE INVENTION

It is therefore an object of the present invention to provide an improved air system for a cotton harvester.

It is a further object to provide an air system for a cotton harvester which reduces the amount of conduit required to supply air to a plurality of cotton conveying ducts.

It is yet another object to provide an air distribution nozzle for an air duct system which permits the use of one common air conduit to supply air to at least two cotton conveying ducts. It is a further object to provide such a nozzle which is effective for dividing air flow between two ducts having differing cotton conveying capacities.

It is still a further object to provide an improved nozzle for a cotton harvester duct system which effectively divides air flow between first and second ducts so that only a single main air supply conduit from a blower is required for the two ducts.

It is yet another object to provide an air duct system for a four-row cotton harvester which requires only a pair of main air conduits to supply four cotton conveying ducts.

These and other objects, advantages and features of the present invention will become apparent to one skilled in the art upon a reading of the following detailed description taken in conjunction with the drawings.

BRIEF DESCRIPTION OF THE DRAWINGS

FIG. 4 is a plan view of the air distribution nozzle.

FIG. 5 is a side view of the nozzle as seen along the line 5—5 in FIG. 4.

FIG. 6 is an end view of the nozzle as seen along the line 6—6 in FIG. 4.

FIG. 7 is a schematic representation of the blower, air supply conduits, and nozzles for the right-hand side of the harvester of FIG. 1.

DESCRIPTION OF THE PREFERRED EMBODIMENT

Figure 1:
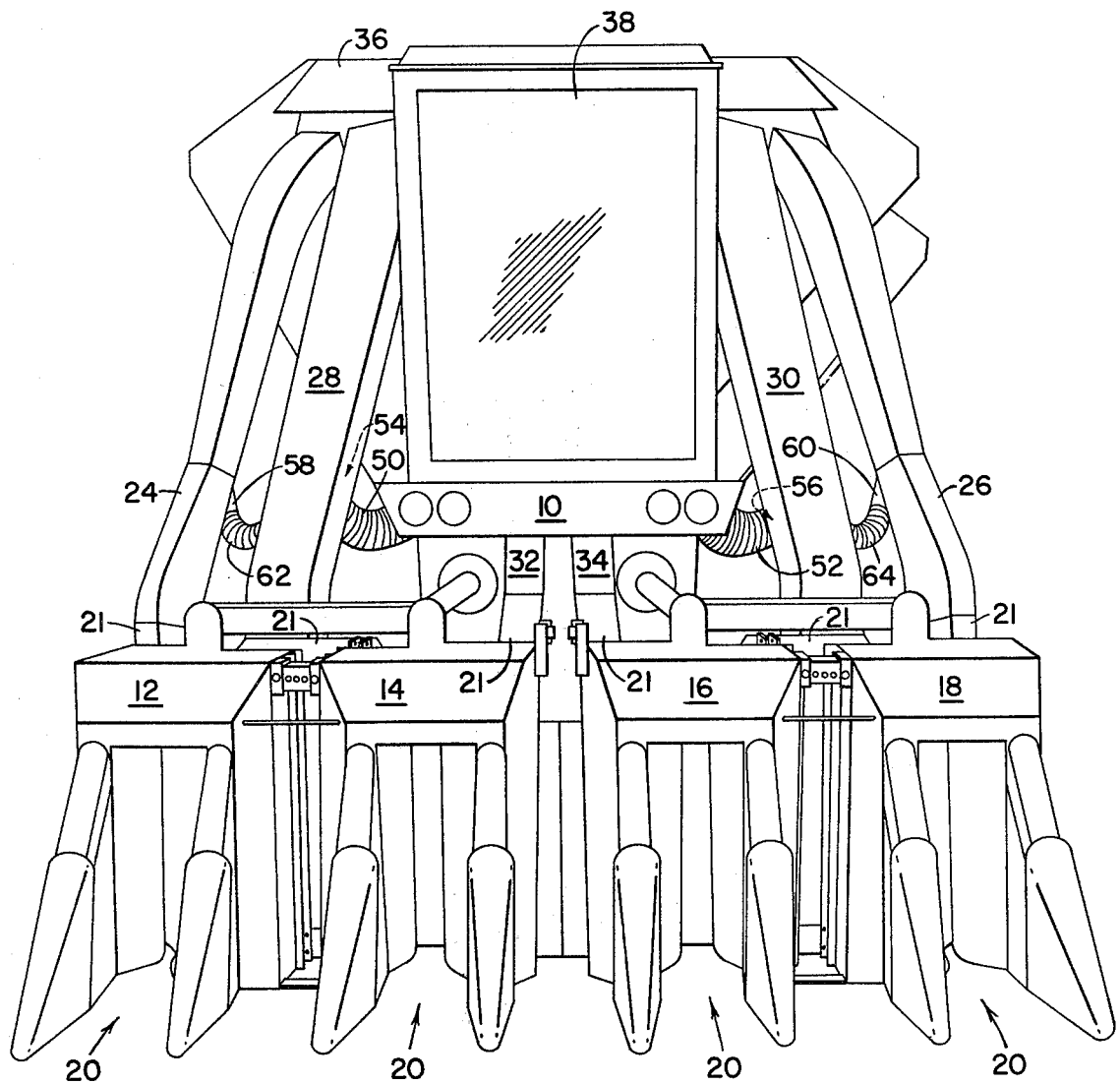
FIG. 1 is a front view of a cotton harvester incorporating the structure of the present invention.
Figure 3:
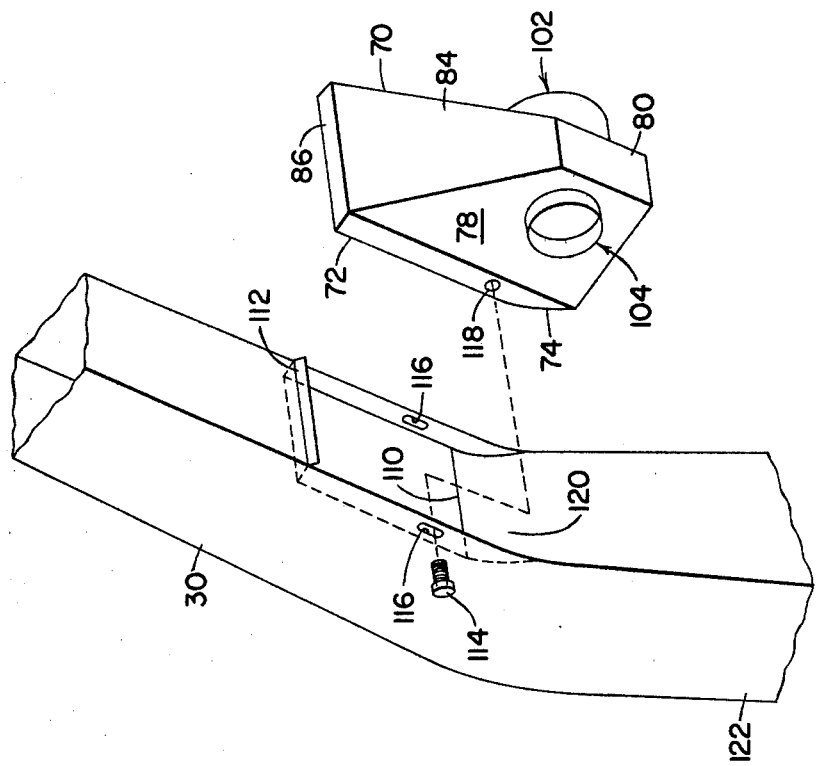
FIG. 3 is an enlarged view of the middle duct of the duct system shown in FIG. 2, with the air distribution nozzle removed.

The cotton harvester as shown in FIG. 1 is basically of the four-row type and includes a main frame 10 supported for forward movement over the ground by a pair of forward traction wheels and a pair of rear steerable wheels (not shown). Supported on the forward end of the frame 10 are four harvesting units 12, 14, 16, and 18 which can be raised and lowered by suitable hydraulic means.

The harvesting units 12-18 include plant passages 20 that receive four rows of cotton plants. Each of the units includes conventional spindle means for removing the cotton from the cotton plants, and doffing means remove the cotton from the spindles and discharge it rearwardly through upright openings in the units 12-18. Each of the units carries upright suction door structure 21 that opens onto the unit to generally close the upright openings and to receive the cotton from the doffing means. The suction door structures do not form part of the present invention and therefore are not fully described, but are referred to only to indicate a preferred cotton harvester on which the invention can be used. If a fuller understanding of the suction door structure is desired reference may be had to copending application Ser. No. 100,317, filed concurrently herewith, entitled "Cotton Harvester" and assigned to the assignee of the present invention. A pair of outer ducts 24 and 26 connected to a pair of door structures receive cotton from the outermost openings of the units 12 and 18, respectively. A pair of high volume middle ducts 28 and 30 communicate with the adjacent openings through corresponding door structures for the pairs of units 12-14 and 16-18, respectively. A pair of smaller inner ducts 32 and 34 communicate with the innermost rear openings on the units 14 and 16, respectively, through duct structure such as shown in the aforementioned U.S. Pat. No. 3,515,437.

The cotton ducts 24-34 extend rearwardly and upwardly from the harvesting units 12-18 to a cotton receptacle 36 supported centrally above the frame 10 and generally rearwardly of an operator's station 38. A blower 40 (FIG. 7), which may be generally of the type shown in U.S. Pat. No. 3,487,450, is located on the frame rearwardly of and below the operator's station 38 and supplies air through air ducts 42 to blower nozzles 44 located on the duct structure associated with the small ducts 32 and 34 to force the harvested cotton upwardly through the ducts to the cotton receptacle 36. Only the air ducts for the right-hand side of harvester as viewed by the operator from the station 38 are shown in FIG. 7 since the left-hand ducts are essentially identical. Extending forwardly from the blower and connected thereto by flexible conduit sections 46 are metal connecting conduits 48 which terminate below the frame 10 behind the inner units 14 and 16 where they are joined by a pair of large flexible air conduits 50 and 52. The air conduits 50 and 52 extend upwardly and outwardly to right and left air distribution nozzles 54 and 56, respectively, connected to the rear of the cotton conveying ducts 28 and 30. The flexible air conduits are secured to the metal conduits 48 by conventional adjustable clamps or the like. Right and left-hand jet nozzles 58 and 60 are connected to the outer ducts 24 and 26, respectively. Short flexible nozzle interconnecting conduits 62 and 64 provide air to the nozzles 58 and 60 from the air distribution nozzles 54 and 56.

Figure 2:
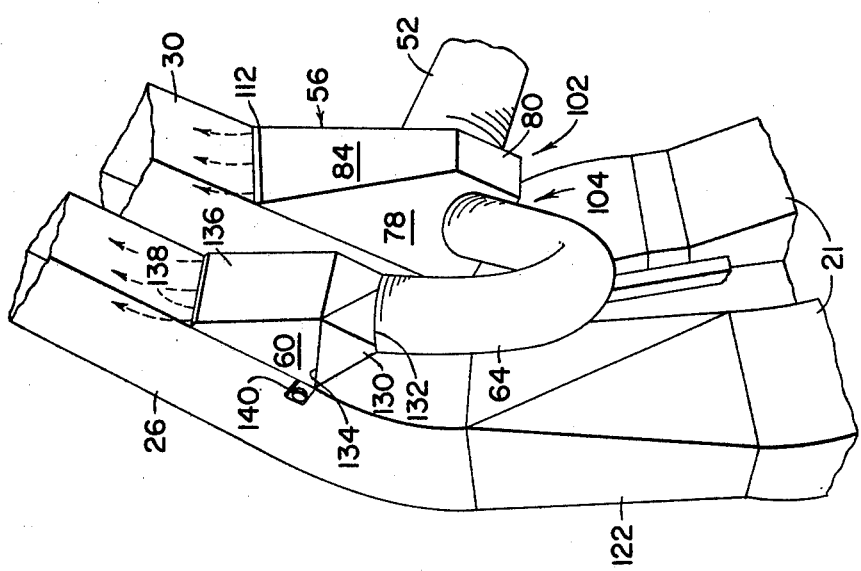
FIG. 2 is an enlarged rear perspective view of the duct system for the left-hand side of the harvester shown in FIG. 1.

The air distribution nozzles 54 and 56 are generally identical so only the left-hand nozzle 56 will be described in detail. The nozzle includes a main body or housing 70, preferably formed from sheet metal, including (as seen in FIG. 2) an upper section 72 of a front wall which is angularly offset from and joined to a lower section 74 of the front wall. Sidewalls 76 and 78 extend in a rearwardly converging direction from the wall 72 and the lower portions thereof are joined to a generally rectangularly-shaped lower portion 80 of a rear wall. Rear wall portion 80 is parallel to the upper front wall section 72. A bottom wall 82, perpendicular to the rear wall section 80, extends between the sections 74 and 80 and closes the bottom of the housing 70. The upper portions of the converging sidewalls 76 and 78 are triangularly shaped and are connected to a trapezoidally shaped upper rear wall section 84. The section 84 is angularly offset from the lower rear wall section 80 and slopes upwardly and forwardly therefrom. A forwardly facing rectangular vent or opening 86 is formed between the sloping wall section 84, the wall 72 and the upper ends of the upper portions of the sidewalls 76 and 78. A large circular hole 88 is provided in the lower portion of facing sidewall 76, and a smaller circular hole 90 is provided in the lower portion of opposite sidewall 78. Surrounding the holes are rim sections 92 and 94 extending transversely from the sidewalls. The flexible air conduit 52 is positioned over the rim 92 and held by a conventional adjustable band or clamp (not shown). The smaller interconnecting conduit 64 is positioned over the rim 94 and is likewise held in position by an adjustable clamp (not shown). As viewed in FIG. 5, the housing 70 defines a generally wedge-shaped chamber with the vent 86 located at the narrow end and with the inlet 102 and outlet 104 on the sidewalls near the wide end. The right-hand air distribution nozzle 54 is essentially the mirror image of the nozzle 56.

Preferably the air distribution nozzle 56 is formed from sections of sheet metal provided with tabs or extensions 100 which are bent to mate with the adjacent portions of the nozzle and are spot-welded thereto. The hole 88 and rim 92 form an inclined inlet 102 which receives a flow of air under pressure from the air conduit 52. The inclination of the inlet 102 directs air flow away from the center of the hole 90. The small hole 90 and the rim 94 form an inclined outlet 104 which receives a portion of the pressurized air entering the inlet 102. The relative inclination and size of the inlet 102 and the outlet 104 cause a greater portion of the air entering the housing 60 to exit through the rectangular vent or opening 86 than to pass through the housing to the outlet 94.

A rectangular opening 110 in the rearward side of the middle duct 30 receives the upper front wall section of the housing 70, and the top of the sloping wall section 84 near the rectangular opening 86 rests on a lip 112 provided near the upper portion of the opening 110. Bolts 114 are inserted through holes 116 in the sidewalls of the duct 30 and through holes 118 in the side of the housing 70 to secure it to the duct. The lower front wall section 74 accommodates a bend in the duct 30 at a location indicated generally at 120 just above the section 122 where the duct joins the door structure 21 of the cotton harvester.

As air is directed into the housing 70 through the inlet 102, a portion of the air, preferably less than half of the volume entering, exits the outlet 104 while the remainder is directed upwardly to the narrow upper end of the housing 70 and out the opening 86. The air is directed generally upwardly from the opening 86 but has a slight forward component with respect to the plane of the section 72 as indicated by the broken arrows in FIG. 2. The jet of air from the opening 86 pushes cotton along the middle duct 30 and also produces a vacuum below the nozzle to draw cotton upwardly from the corresponding door structure for the row units 16 and 18. The remainder of the air flowing into the air distribution nozzle 56 passes through the outlet 104 to the nozzle 60 via the interconnecting conduit 64.

The right-hand and left-hand nozzles 58 and 60 are essentially identical and include a funnel-shaped inlet section 130 having a cylindrical-shaped lower portion 132 for receiving the flexible conduit thereon. The inlet section extends upwardly to a generally rectangularly-shaped cross-section at 134. The rectangularly-shaped portion is joined to a hollow wedge-shaped portion 136 which terminates at its upward converging end in a narrow slot 138. Conventional brackets 140 are provided near the funnel-shaped section 130 to secure the nozzle to the rear side of the duct 26. The upper portion of the wedge-shaped portion 136 is positioned against the rear of the duct with the slot end of the nozzle inserted into the duct to direct air from the connecting conduit 64 upwardly and slightly forwardly into the duct as indicated by the broken arrows in FIG. 2. The nozzles 58 and 60 are preferably formed from sheet metal in a fashion similar to that of the nozzles 54 and 56.

In the preferred embodiment, each of the middle ducts 28 and 30 is connected to and receives cotton from a double door assembly, which services two high capacity, forward spindle drums on adjacent inner and outer row units. More than half of the cotton from the corresponding two rows enters the double door assembly. Therefore, the middle ducts 28 and 30 convey a larger volume of cotton and are much larger then the outer ducts 24 and 26 and inner ducts 32 and 34. Accordingly a large portion of the air from the blower 40 must be directed to the ducts 28 and 30 to move the high volume of cotton. In the preferred embodiment, seven inch (17.8 cm) air distribution conduits 50 and 52 and four inch (10.2 cm) connecting conduits 62 and 64 are utilized.

In operation, cotton is discharged by the harvesting units 12–18 into the rear door and duct structure which communicate with the cotton conveying ducts 24–34. Air from the blower 40 is introduced into the duct structure near the lower portion of the ducts 32 and 34 by the nozzles 44 to force the cotton upwardly therethrough into the cotton harvesting receptacle 36. If a more complete description of the duct structure is desired, reference may be had to the aforementioned U.S.

Pat. No. 3,515,437. It is to be understood that various conventional types of duct structure and door structure may be used with the row units, and specific embodiments are given by way of example only and are not to be considered as limiting the invention beyond the scope of the claims. Air is also introduced under pressure through the air conduits 50 and 52 into the inlets 102 of the right- and left-hand air distribution nozzles 54 and 56. A portion of the air is directed at a high velocity through the nozzle openings 86 creating a vacuum in the duct below the nozzles, drawing the cotton upwardly from the rear door assemblies through the ducts and conveying it upwardly to the basket 36. A portion of the air which enters the nozzles 54 and 56 is directed out the outlets 104 through the flexible connecting conduits 62 and 64 and upwardly through the nozzle outlets 138 into the outer ducts 24 and 26 to suck the cotton from the outer door assemblies of the units 12 and 18 and propel it to the cotton receptacle 36. The nozzles 54 and 56 effectively divide the air flow, eliminating the need for a separate flexible air conduit from the blower to the nozzles on the outer ducts 24 and 26.

Having described the preferred embodiment, it will become apparent to those skilled in the art that various modifications may be made without departing from the spirit and scope of the invention as defined in the claims which follow.

I claim:

1. In a cotton harvester having at least first and second ducts with an input end for receiving harvested cotton to be conveyed and a discharge end for discharging the harvested cotton from the duct, an air blower, and air distributing means for directing the air from the blower into the ducts toward the discharge ends and causing flow of the cotton through the ducts, the improvement in the distributing means comprising:

an air distribution nozzle including an inlet port for receiving air from the blower, an outlet port, and a vent;

means for connecting the air distribution nozzle to the first duct with the vent opening into the first duct;

first conduit means connected between the inlet port and the blower for supplying air to said port, and causing air flow through the outlet port and the vent;

a nozzle member including an inlet port and a discharge port in communication with the second duct; and second conduit means connected between the outlet port of the air distribution nozzle and the inlet port of the nozzle member for supplying air from the outlet port of the distribution nozzle to the second duct.

2. The invention as set forth in claim 1 including means for restricting the flow of air through the outlet port of the air distribution nozzle to provide a greater flow of air through the vent than through the discharge port.

3. The invention as set forth in claim 1 wherein the second conduit means comprises a flexible air conduit.

4. In a cotton harvester having at least four transversely spaced harvesting units for removing cotton from four rows of cotton plants, a cotton receptacle, and four transversely spaced cotton conveying ducts including two middle ducts and two outer ducts for conveying cotton from the units to the receptacle, an air distribution system for supplying air to the conveying ducts for moving the cotton therethrough, comprising:

first and second air distribution nozzles, each including an inlet, an outlet, and a nozzle opening;

a blower located on the harvester generally centrally and rearwardly with respect to the transversely spaced units;

first and second elongated conduit means connected between the blower and the respective air distribution nozzle inlets for supplying a flow of air from the blower into the distribution nozzles;

means for connecting the air distribution nozzles to the respective middle ducts so that the nozzle opening on each opens into the corresponding middle duct in the direction of cotton flow;

a pair of nozzle members, each connected to a respective outer duct and including an inlet located adjacent the outlet of the air distribution nozzle for the adjacent middle duct, and a nozzle opening which opens into the outer duct in the direction of cotton flow through the duct; and first and second interconnecting means connected between the respective adjacent air distribution nozzle outlets and the nozzle member inlets for directing a portion of the flow of air from each distribution nozzle to the corresponding nozzle member.

5. The invention as set forth in claim 4 wherein each air distribution nozzle includes means for diverting the flow of air through the inlet away from the outlet so that more air flows through the nozzle opening of the air distribution nozzle than through the outlet to the corresponding nozzle member thereby permitting the middle ducts to convey a larger volume of cotton than the corresponding outer ducts.

6. In a cotton harvester having a cotton receptacle, harvesting units and first and second conveying ducts with an input end for receiving harvested cotton from the units and a discharge end for discharging the harvested cotton from the duct, a blower, and air distributing means for directing air from the blower into the ducts toward the discharge end causing flow of the cotton through the ducts, the improvement in the air distributing means comprising:

an air distributor housing connected to the first duct including inlet means for directing air flow from the blower into the distributor housing, vent means in communication with the first duct near the input end thereof for venting a portion of the air flow from the blower into the duct, and output means for directing a portion of the air flow away from the distributor housing;

a nozzle member in communication with the second duct near the input end thereof, and means connecting the nozzle member with the output means of the distributor housing for channeling the air directed away from the distributor housing through the nozzle member and into the second duct.

7. The invention as set forth in claim 6 wherein the inlet means comprises a first flexible conduit extending between the blower and the inlet of the distributor housing and wherein the means for connecting the nozzle member with the output means comprises a second flexible conduit.

8. The invention as set forth in claim 7 wherein the first and second conduits are circular in cross-section, and wherein the first conduit has a larger cross-section than the second conduit.

9. The invention as set forth in claims 7 or 8 wherein the air distribution housing includes a pair of opposed sidewalls, and wherein the inlet and outlet means include opening means in the respective sidewalls for receiving the first and second conduits, respectively.

10. In a cotton harvester having transversely spaced harvesting means for removing cotton from cotton plants, a cotton receptacle, two pairs of adjacent transversely spaced air ducts for conveying the removed cotton to the cotton receptacle, and a blower centrally located on the harvester with respect to the harvesting means for supplying a flow of air to the air ducts to convey the cotton therethrough, an air distribution system for supplying air to the two pairs of adjacent air ducts, comprising:

first and second air distribution nozzles connected to the two respective innermost air ducts, each distribution nozzle including a central chamber and an inlet port facing generally in the direction of the blower, an outlet port facing generally outwardly in the direction of the adjacent air duct, and a vent opening into the duct, wherein said inlet port, outlet port and vent are in communication with the central chamber;

first and second conduits connected between the blower and the first and second inlet ports, respectively, for supplying air to the chambers;

first and second nozzle members supported by the respective outer ducts, each including an outlet port opening into its supportive duct, and an inlet port; and flexible interconnecting conduit means extending outwardly from the outlet port of the distribution nozzle to the nozzle member inlet port of each pair of adjacent ducts for directing a portion of the air from the chambers to the respective nozzle members.

11. In a cotton harvester having a cotton harvesting apparatus, a cotton receptacle rearwardly of and vertically offset from the apparatus, and cotton conveying ducts extending from the apparatus to the cotton receptacle, the improvement residing in an air system for supplying air to move the cotton through the ducts comprising:

an air distribution nozzle associated with a first one of the ducts, said nozzle including;
a chamber, an inlet opening into the chamber, and an outlet opening out of the chamber;
a blower;
means connected between the blower and the inlet for supplying air from the blower through the inlet to the chamber;
said nozzle further comprising vent means in communication with the chamber and the first duct for directing a portion of the air from the blower into the first duct;
a jet nozzle associated with a second one of the ducts and including an inlet;
means connected between the jet nozzle inlet and the distribution nozzle outlet for supplying a portion of the air from the chamber to the jet nozzle; and
the jet nozzle including vent means for directing the air from the chamber outlet into the second duct.

12. The invention as set forth in claim 11 wherein the distribution nozzle inlet and outlet are located on opposite sides of the chamber.

13. The invention as set forth in claims 11 or 12 wherein the distribution nozzle inlet and outlet are in the shape of cylinders.

14. The invention as set forth in claim 13 wherein the area of the distribution nozzle outlet is smaller than the area of the distribution nozzle inlet.

15. The invention as set forth in claim 11 wherein the distribution nozzle chamber is generally wedge-shaped, the distribution nozzle vent means comprises a slot in the narrow portion of the wedge-shaped chamber, and the distribution nozzle inlet and outlet are located in opposite sidewalls of the wedge-shaped chamber.

16. In a cotton harvester having a fore-and-aft extending main frame, cotton harvesting apparatus supported forwardly of the main frame, a cotton receptacle rearwardly of and vertically offset from the apparatus, and first and second adjacent cotton conveying ducts extending from the apparatus to the cotton receptacle, the improvement residing in an air system for conveying cotton through the ducts including:

an air distribution nozzle connected to the first duct;
a blower;
conduit means connected between the blower and the air distribution nozzle for supplying air to the distribution nozzle;
said distribution nozzle including vent means in communication with the first duct for supplying a stream of air thereto to propel the cotton through the duct to the receptacle, an outlet for exhausting a portion of the air from the nozzle, and means for restricting the amount of air exhausted from the nozzle; and
jet nozzle means connected between the second duct and the distribution nozzle outlet for directing the air exhausted from the distribution nozzle into the second duct to propel the cotton through the duct to the receptacle.

* * * * *